United States Patent
Bathen et al.

(10) Patent No.: US 10,581,621 B2
(45) Date of Patent: Mar. 3, 2020

(54) ENHANCED CHAINCODE ANALYTICS PROVENANCE IN A BLOCKCHAIN

(71) Applicant: International Business Machines Corporation, Armonk, NY (US)

(72) Inventors: Luis Angel D. Bathen, Placentia, CA (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/598,591

(22) Filed: May 18, 2017

(65) Prior Publication Data

US 2018/0337770 A1   Nov. 22, 2018

(51) Int. Cl.
*H04L 9/06* (2006.01)
*H04L 9/32* (2006.01)

(52) U.S. Cl.
CPC .......... *H04L 9/3297* (2013.01); *H04L 9/3239* (2013.01); *H04L 2209/38* (2013.01)

(58) Field of Classification Search
CPC .. H04L 9/3297; H04L 9/3239; H04L 2209/38
USPC ........................................................ 713/168
See application file for complete search history.

(56) References Cited

U.S. PATENT DOCUMENTS

| | | | | |
|---|---|---|---|---|
| 9,436,923 | B1 * | 9/2016 | Sriram | H04L 63/126 |
| 10,007,826 | B2 * | 6/2018 | Ebrahimi | G09C 5/00 |
| 10,102,526 | B1 * | 10/2018 | Madisetti | H04L 9/3239 |
| 2009/0187887 | A1 * | 7/2009 | Richins | G06F 9/445 717/120 |
| 2011/0218966 | A1 * | 9/2011 | Barnes | G06F 11/1451 707/645 |
| 2013/0322771 | A1 * | 12/2013 | Poyil | G06K 9/4647 382/203 |
| 2016/0164884 | A1 * | 6/2016 | Sriram | G06Q 10/06315 705/51 |
| 2016/0217436 | A1 * | 7/2016 | Brama | G06Q 20/06 |
| 2016/0260169 | A1 * | 9/2016 | Arnold | G06Q 40/12 |
| 2017/0052676 | A1 * | 2/2017 | Pulier | G06F 3/04817 |
| 2017/0140408 | A1 * | 5/2017 | Wuehler | G06Q 30/0207 |
| 2017/0149819 | A1 * | 5/2017 | Androulaki | H04L 63/123 |
| 2017/0163733 | A1 * | 6/2017 | Grefen | H04L 9/3236 |
| 2017/0201582 | A1 * | 7/2017 | Zhang | G06F 9/5027 |
| 2017/0237570 | A1 * | 8/2017 | Vandervort | H04L 63/0442 713/176 |

(Continued)

OTHER PUBLICATIONS

Anonymous, Method and System for Providing Advanced, Analytics Environment (AAE) Framework for Effective Management of Data and Insights, ip.com, May 6, 2014.

(Continued)

*Primary Examiner* — Farid Homayounmehr
*Assistant Examiner* — Sanchit K Sarker

(57) ABSTRACT

A blockchain of transactions may be referenced for various purposes and may be later accessed by interested parties for ledger verification and information retrieval. One example method of operation may include one or more of storing original data in a blockchain, storing transformed data based on the original data in the blockchain, storing chaincode on the blockchain used to transform the original data to the transformed data, and retrieving a transaction from the blockchain with the transformed data and the chaincode.

18 Claims, 7 Drawing Sheets

(56) References Cited

U.S. PATENT DOCUMENTS

| | | | | |
|---|---|---|---|---|
| 2017/0243193 | A1* | 8/2017 | Manian | G06Q 20/3829 |
| 2017/0243287 | A1* | 8/2017 | Johnsrud | G06Q 40/025 |
| 2017/0244757 | A1* | 8/2017 | Castinado | H04L 63/20 |
| 2017/0287090 | A1* | 10/2017 | Hunn | G06Q 50/18 |
| 2017/0366347 | A1* | 12/2017 | Smith | H04L 9/3221 |
| 2018/0101906 | A1* | 4/2018 | McDonald | G06Q 40/04 |
| 2018/0227275 | A1* | 8/2018 | Russinovich | H04L 63/0435 |
| 2018/0241546 | A1* | 8/2018 | Leng | H04L 9/0637 |
| 2018/0308566 | A1* | 10/2018 | Dempers | G06F 21/35 |
| 2018/0332011 | A1* | 11/2018 | Gray | H04L 9/3247 |
| 2018/0337770 | A1* | 11/2018 | Bathen | H04L 9/3239 |
| 2019/0042989 | A1* | 2/2019 | Scott | G06Q 10/0633 |
| 2019/0050855 | A1* | 2/2019 | Martino | H04L 9/3239 |
| 2019/0058595 | A1* | 2/2019 | Hamasni | G06Q 20/3825 |

OTHER PUBLICATIONS

Anonymous, Framework to Support Versioning of a Run of Big Data Applications, ip.com, Jan. 9, 2014.

Kim, HM. et al.; Towards an Ontology-Driven Blockchain Design for Supply Chain Provenance, Google, 2015.

\* cited by examiner

550

ENHANCED CHAINCODE ANALYTICS PROVENANCE IN A BLOCKCHAIN

TECHNICAL FIELD

This application generally relates to providing data support, and more particularly, to enhanced chaincode analytics provenance in a blockchain.

BACKGROUND

A blockchain may be used as a public ledger to store any type of information. Although, primarily used for financial transactions, a blockchain can store any type of information including assets (i.e., products, packages, services, status, etc.). A blockchain may be used to securely store any type of information in its immutable ledger.

Data analytics engines are becoming increasingly popular in the enterprise. Cognitive solutions rely on a wide portfolio of analytics tools, all of which are based on large amounts of data. As a result, data is becoming more valuable. However, as the value of data continues to increase so does the need to protect the data, and prove that the insights being derived from the data are valid. Many enterprises offer APIs and services that require users to send their data with the goal of providing insights. However, data trust models are requiring data provenance proof as to where does the data come from and whether the data is originating from trusted or untrusted sources, and what services affected the data in its route to its final destination, which may be referred to as data analytics provenance. This may also include determining what algorithms and transformations were used to derive the insights/results being sent back to the client. Concerns regarding the data and the software stack used with the data requires end-to-end provenance of the analytical data results.

In a traditional data flow for a traditional analytics engine, there are several data sources that come from trusted or untrusted sensors/agents. The data is then sent to an ingestion portal through the Internet/world-wide-web where the data is then transformed and ingested into a data store (e.g., DB2, HDFS, etc.). Next, the analytics engine will query the data, and apply some machine learning/data mining algorithms that will yield reports, insights, etc. This process is insecure since new attacks have emerged that try to pollute/manipulate the data insights that results from those analytics engines. Such phenomena has enabled the use of adversarial machine learning, where classifiers are trained to ignore, detect, or withstand such attacks against the algorithms. In adversarial machine learning, most of the attacks are trying to process malicious data, or tamper with the data that is being analyzed, which results in a demand for data provenance in order to establish some form of trust for auditing purposes. Adversarial machine learning works on the premise that attackers may tamper with the data, so there must be ways to protect the data and use different classifiers together to withstand attacks, as well as build secure algorithms.

One key way of preventing attacks on analytics engines is identifying malicious data sources by tracing data paths. Data provenance may include specific results being logged. The logged data may be logged into a centralized database. Simple tags are generated at each point when data was provided into the system, where data was stored, what algorithms were used to process the data, and what results would be associated with the algorithm, such as expected results. However, concerns over the data integrity still exist since data tampering can happen when the data is stored in a centralized database. Even if the database is distributed, data can still be tampered with and compromised. Similarly, most provenance schemes only store checkpoints or simple metadata that reflects what data changes/transformations have occurred.

SUMMARY

One example embodiment may provide a method of operation which may include one or more of storing original data in a blockchain, storing transformed data based on the original data in the blockchain, storing chaincode on the blockchain used to transform the original data to the transformed data, and retrieving a transaction from the blockchain with the transformed data and the chaincode.

Another example embodiment may include an apparatus that includes a processor configured to store original data in a blockchain, store transformed data based on the original data in the blockchain, store chaincode on the blockchain used to transform the original data to the transformed data, and retrieve a transaction from the blockchain comprising the transformed data and the chaincode.

Another example embodiment may include a non-transitory computer readable storage medium configured to store instructions that when executed cause a processor to perform one or more of storing original data in a blockchain, storing transformed data based on the original data in the blockchain, storing chaincode on the blockchain used to transform the original data to the transformed data, and retrieving a transaction from the blockchain with the transformed data and the chaincode.

DETAILED DESCRIPTION

Figure 1:
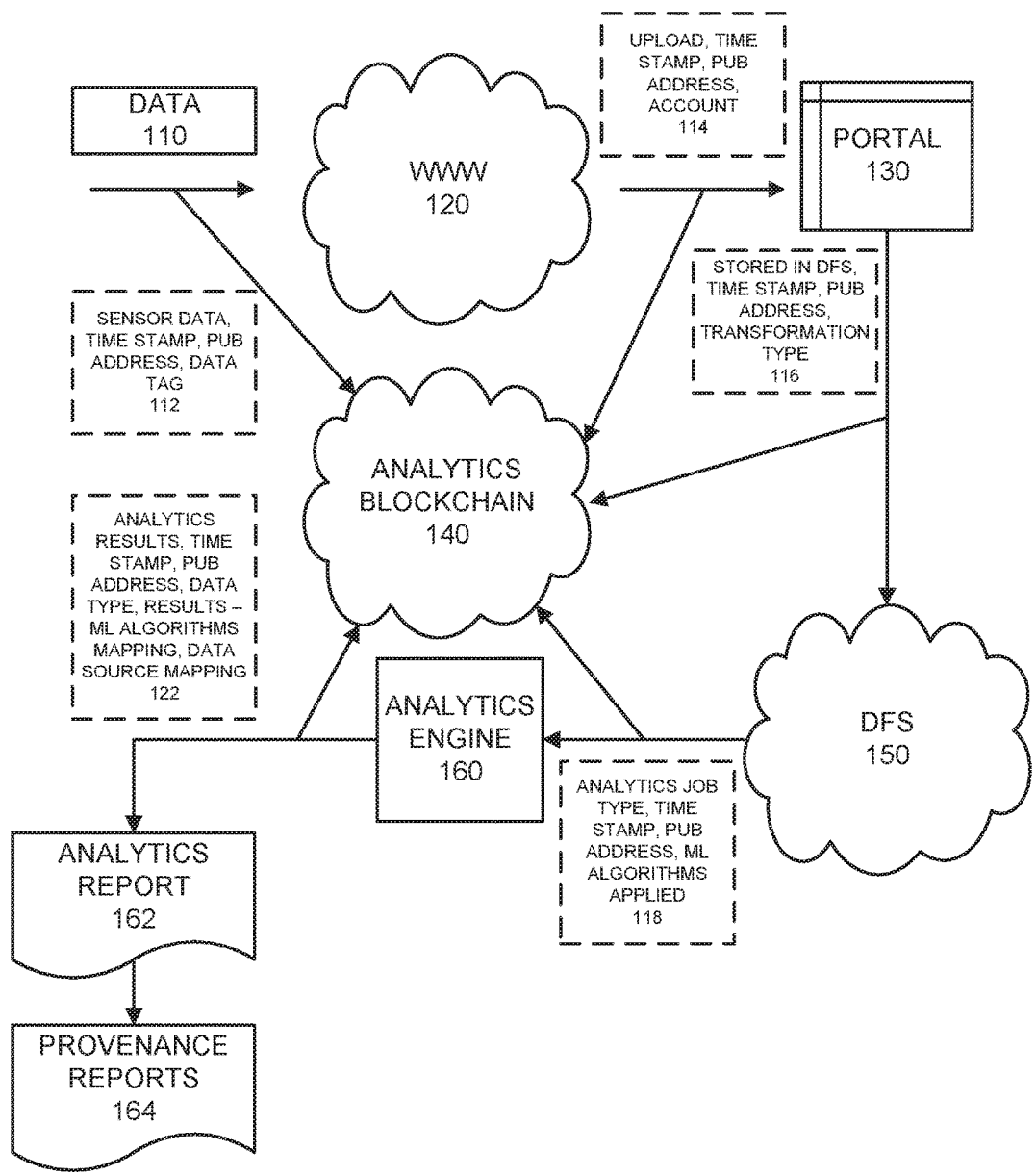
FIG. 1 illustrates a logic data configuration used to determine data provenance with a blockchain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to using a blockchain to provide provenance data support, and in another embodiment relates to storing data and analytics in blockchain transactions for data updates and subsequent data audit purposes. Blockchain immutability, for data persisted onto the blockchain, including both transformed resultant data, such as metadata, and the original data itself can preserve all such data for subsequent audit records. Also, if the history of data transformations can be identified and logged, then the burden of finding out what software version was run, where the software came from, as well as where the data is stored, and how to access the data can be alleviated.

Example embodiments include a system, device and/or a method to provide end-to-end provenance for data including data output from analytical engines via a blockchain. This approach provides provenance of data with respect to its origin, its processing, and transformation. The blockchain provides an immutable record of all data necessary to monitor the data, the data path, as well as save an exact snapshot of the software that engaged the data at any given time. This ensures that users are permitted to exercise the full stack at each specific point of the data path and re-run the different algorithms the data was exposed to in route to a final state and/or destination. The analytics provenance framework permits users to audit the data results and determine where the data is coming from, what transformations the data underwent, and any analytics frameworks in which the data was exposed, and the ability to replay and verify results by processing the analytics all the way from the time data was input into the system. The original data, as well as the transformed data, are stored a blockchain. The analytics core is then preserved as chaincode (CC) onto the blockchain and deployed each time the analytics are run. This permits users to keep track of all original data, temporary results, as well as the codebase used to process the data. Thus, for any given analytics workload, the entire execution path is captured as well as the data path in the blockchain.

A data path is an entire path that data would follow, starting from the time the data was generated by some sensor, to the different storage and network infrastructures where the data was stored. Also, the analytics reports/predictions generated from applying transformations to such data are also part of the data path. For instance, the data path for the weather data could include: 1) data from sensors in homes, 2) the gateway that collects such sensor data, 3) the cloud provider that stores that data, 4) some normalization transformation performed to make weather prediction easier, 5) the weather prediction algorithm, and 6) the weather prediction report. In this example, the operations that lead to weather prediction using the sensor data are captured and stored in the blockchain for provenance purposes.

In order to provide analytics provenance, the entire data path for a given source as well as a full stack of software/protocols that transformed the data must be identified. Providing provenance with a centralized database always leaves the data vulnerable. The databases are dependent on service level agreements (SLAs) provided by the hosting party. Blockchain provides immutability of data due to the nature of an immutable ledger. In order to provide provable provenance, the data paths must be demonstrated to include routes, transformations, protocol modifications, software conversions, etc., so a forensic investigation can be performed to take the result and compare the result to the original data after having undergone such modifications. This requires the original data, the transformed data and a list of all the recorded modifications to the data to be available for audit purposed by any interested party. Such modification data may be more than just which server the data was uploaded to and what transformations it underwent, but also what was the software stack at different points in time for a particular point in time, and in this case, at each point in the data's path.

One example may include a storage analytics engine that uses client data to determine whether storage volumes are mapped to the right storage tier. The analytics engine may use clients to install performance data monitors in their data centers (sensors), and data monitors to track IO, capacity, among other metrics for the storage backend (volumes, pools, disks, etc.). Each reading comes in the form of a DATAPOINT=<Volume ID, IOPS, Size, Timestamp>. The monitors (sensors) then upload the data to a storage portal. The service confirms that the data from the account sensors (monitors) has been uploaded. The storage portal takes each DATAPOINT and runs a set of analytics/transformations to normalize the data. For instance, we care about hourly and daily IO density given by the formula: IO Density=IOPS/Size, average IO density is average IOPS/hour for a volume, then AvgIO Density=AvgIOPS/Size. The data and transformation metadata is then added to the Blockchain. Once these transformations have been performed, the next step is to run a 'tiering' analytics operation, which takes the hourly IO density for each volume and compares it to a pre-defined table. Based on the IO density and the boundaries for different tier levels, a tier is decided for the storage volume. This generates a 'tiering' report. The analytics codebase of the data is then added to the blockchain as well as the report for provenance purposes. This permits a provenance graph to be built that contains both metadata as well as data associated with some analytics report.

The process for data provenance may include, upon entry into the system, the client will sign the data and enter it into the blockchain, data is then uniquely identified by the hash of the public address, the data hash and the time stamp. The source is associated with the data via its unique public address, this way the source can be identified in the event of an audit. For each transformation or move, a new record is entered into the blockchain, signed by the given node processing the data, and time stamp is added as well as the hash of the newly transformed data. For each transformation, a transaction is created that uses as input the data at its previous form, the unique ID for the data, and the different metadata used to identify the given software stack, the output will be the transformed data with a new ID. This transaction is then recorded in the blockchain. This process continues until the data reaches its final state in the form of an analytics report or insight.

FIG. 1 illustrates a logic data configuration used to determine data provenance with a blockchain according to example embodiments. Referring to FIG. 1, the configuration 100 includes data 110 which is sent and received through the web 120 and received at a portal application 130, which may process and store the data in a data file system DFS 150. The analytics engine 160 may create analytics reports 162 and identify data necessary to prove the provenance 164. The data elements 112 may include sensor data, time stamps such data is received/sent/created, publication addresses of entities sending and receiving data, and any data tags/metadata. Once the data is sent to the portal the account information of the recipient may also be noted 114 along with the other identified data parameters. The data received at the portal 130 may include time stamps of data storage and any transformations to the data 116. The data sent to the analytics 160 may include job type, along with any machine learning algorithms applied to the data 118. Also, the analytic results, mappings and data source mapping may also be noted 122. All such data is stored in the blockchain 140 for retrieval and accuracy when attempting to confirm and reproduce the results.

According to example embodiments, a software client may be used that monitors the performance of different storage infrastructures (e.g., a storage controller). The sensors can be embedded in storage management suites. Each sensor generates performance data. This data is generated and pushed onto the metadata which is forwarded onto the blockchain. The metadata is flexible enough for the different examples to define what the metadata might contain. For instance, in a storage monitoring example, metadata could include a sample timestamp, sample volume ID, and sample data center ID. This metadata is then sent to the blockchain.

The term 'sensor' may denote something that monitors an environment and generates some data based on that environment. For instance, a thermostat that generates weather information is a sensor. That information may be sent to a cloud provider for reference purposes. Once the data is forwarded to the cloud, in one example, a weather prediction service may run various types of analytics on such thermostat sensor data, and generate predictions using that data. Similarly, a software client of a data center tracking CPU/memory utilization, and uploading such information to a cloud, permits the data to be further analyzed by a resource management engine, and used to decide where workloads should be scheduled. Hence, the sensor data could be a generic term to describe different examples, such as hardware (i.e., thermostat sensors) to software sensors used to monitor computing devices.

Once data has been subjected to the provenance operations above, users can then retrieve the associated records with each analytics insight and observe a provenance graph stored within the blockchain. In order to audit the software stack that executed at that particular point in time. Rather than storing only metadata describing algorithms that were applied to the data, the software stack is also stored as chaincode (CC) within the blockchain. At any given time, the correct version of the software and environment can be pulled from the blockchain and processed at a particular set of times which would permit invocation of run-times that exist in the blockchain and the ability to execute them from within the blockchain.

The following code is an example of a sample chaincode that computes IO density.

```
def compute_io_density(self):
    for volume in self.volumes.values( ):
        vol_id = volume.storage_volume_id
        capacity = float(volume.space) / 1024**3
        io_average = 0.0
        if vol_id not in self.samples:
            # try vol id instead of storage volume id
            if volume.volume_id in self.samples:
                print ('volume.%s has no samples, but volume.%s does...' % (vol_id, volume.volume_id))
                volume.io_density - None
                continue
            if len(self.samples[vol_id]) == 0:
                print ('volume.%s has no samples, but volume.%s does...' % (vol_id, volume.volume_id))
                continue
        for sample in self.samples[vol_id]:
            if sample['io']:
                io_average += float(sample['io'])
        io_average /= len(self.samples[vol_id]).
```

The compute IO density chaincode provides that each data point or sensor data retrieved is aggregated for a particular volume. Then, once the data is aggregated, the data is then used to compute IO density given by the formula IO per second/volume size. Another sample of chaincode is used to determine what the tier is, given the volume IO density information. Each of these chaincode are deployed within the blockchain fabric, and new records are generated describing what each chaincode did to transform the data. In this example, there are three transformations: 1) data aggregation, 2) computation of IO density, and 3) generation of a volume storage tier. Also, from this process, an analytics report/recommendation is generated as a user interface with analytic analysis, such as graphs, tables or other data realizations which are user recognizable. The sample chaincode for computing the TO density includes:

```
def determine_actual_volume_tier(self):
    for volume in self.volumes.values ( ):
        if volume.io_density >= 1:
            volume.tier = Tiers.Tier0
        elif volume.io_density < 1 and volume.io_density >= 0.7:
            volume.tier = Tiers.Tier1a
        elif volume.io_density < 0.7 and volume.io_density >= 0.5:
            volume.tier = Tiers.Tier1b
        elif volume.io_density < 0.5 and volume.io_density >= 0.1:
            volume.tier = Tiers.Tier2
        elif volume.io_density < 0.1 and volume.io_density >= 0.01:
            volume.tier = Tiers. Tier 3
        elif volume.io_density < 0.01 and volume.io_density >= 0.0:
            volume.tier = Tiers.Nearline
        elif volume.io_density == 0:
            volume.tier = Tiers.Inactive
        else:
            volume.tier = Tiers.Unknown.
```

Figure 2:
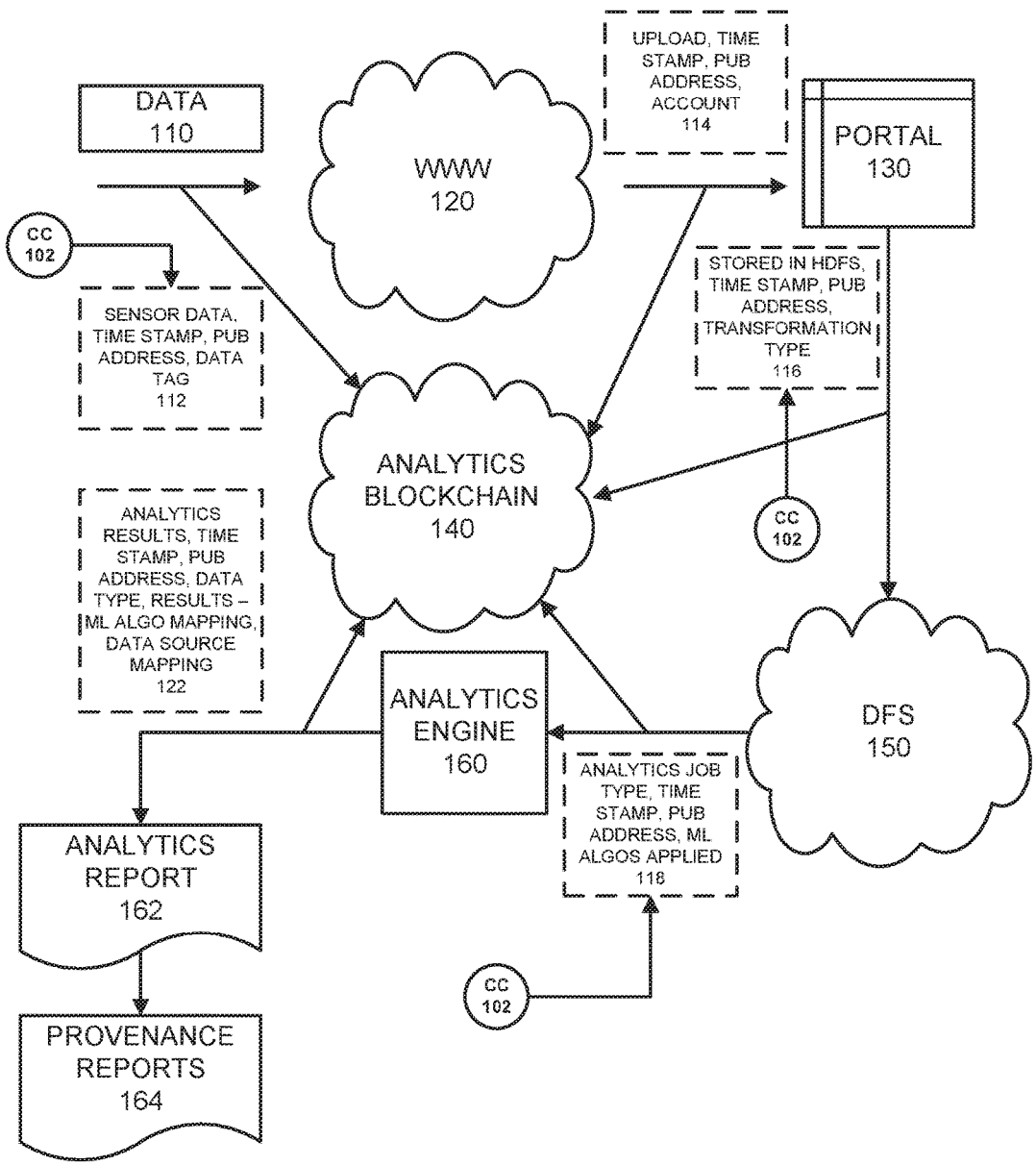
FIG. 2 illustrates a logic data configuration used to determine data provenance with chain code in a blockchain according to example embodiments.

FIG. 2 illustrates a logic data configuration used to determine data provenance with chain code in a blockchain according to example embodiments. Reference numerals depicted in FIG. 2 that are the same as those that are depicted in FIG. 1 will not be described further. Referring to FIG. 2, this example 200 goes beyond data provenance and a blockchain by adding a chain code provenance 102 to the blockchain. As a result, at any given time, for any transformation performed to the data, the respective software stack must also be recorded, so that when an interested party needs to verify/audit/re-process the actions, then the exact same stack can be invoked and applied to the original data. In this example, one codebase could be deployed (e.g., one baseimage), which would then be launched prior to executing the chaincode.

Figure 3:
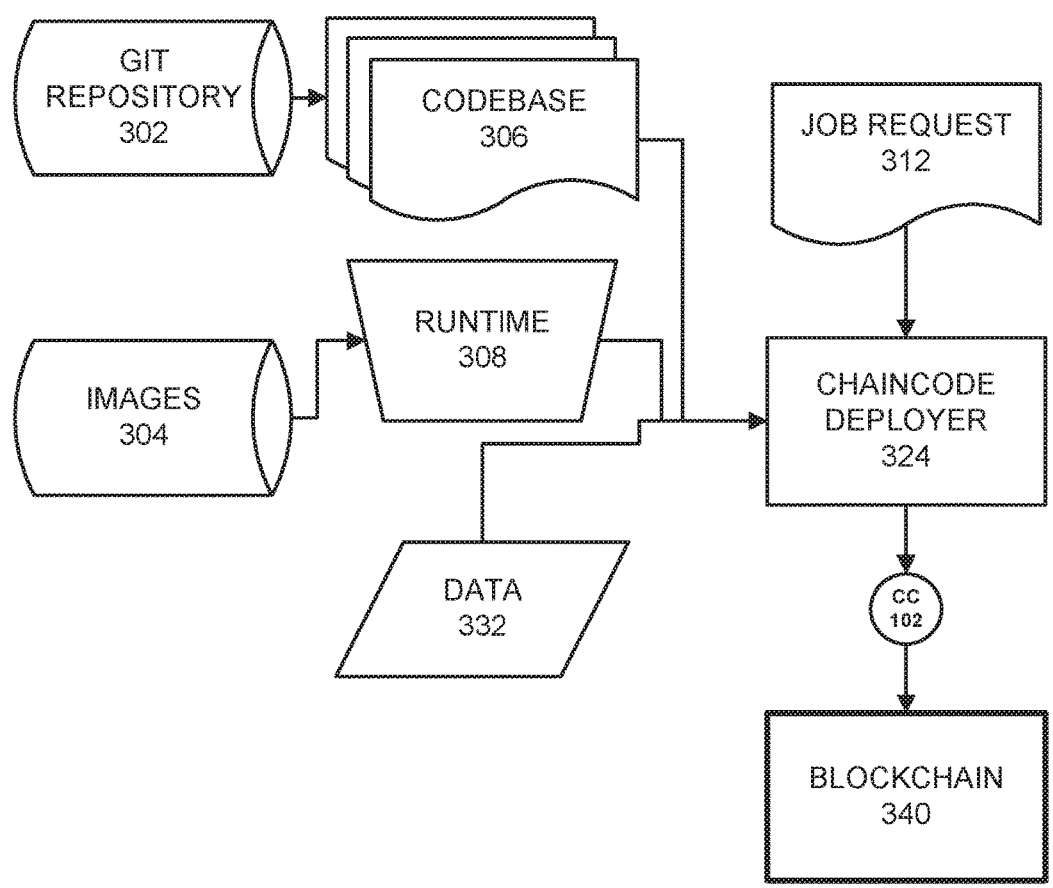
FIG. 3 illustrates a logic data configuration used to generate and deploy chain code with a blockchain according to example embodiments.

FIG. 3 illustrates a logic data configuration used to generate and deploy chain code with a blockchain according to example embodiments. Referring to FIG. 3, the chaincode deployment scheme 300 may include defining the base environment needed to run a job and build an image 304 retrieved from a repository 302, which could be stored within the blockchain 340 itself. For example, images in the context of containers, such as when a container is built a base image is created. Also, whenever a new codebase 306 is deployed from the repository 302, the latest version could be retrieved, linked to a runtime 308 already stored in the blockchain, and used to create a chaincode binary 324. The chaincode is then added to the chain every time a new job request 312 is received and for every transaction, every transformation, the process is repeated. Upon execution, when the job request is received, the network nodes will retrieve the chaincode metadata deployed, obtain the runtime 308 and codebase 306 from the blockchain, build the binary, and execute the binary accordingly based on the original data 332. The next operation is recording the results as well as the metadata of the chaincode 102 that was produced. A comparison may be performed to ensure what was processed from the blockchain matches the results which were originally logged in the blockchain.

Figure 4:
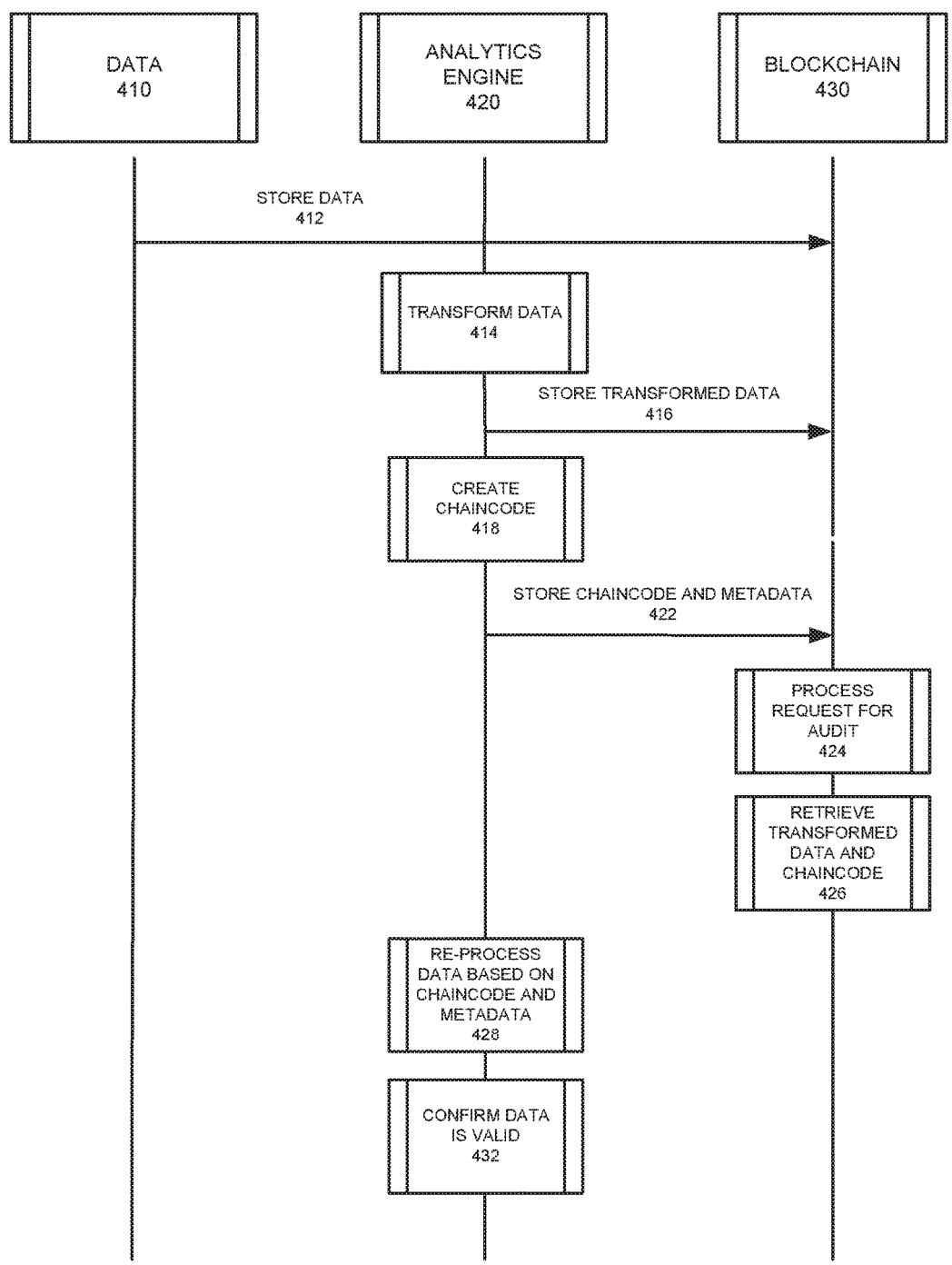
FIG. 4 illustrates a system signaling diagram of the interactions between a blockchain and data sources according to example embodiments.

FIG. 4 illustrates a system signaling diagram of the interactions between a blockchain and data sources according to example embodiments. Referring to FIG. 4, the system 400 includes data 410 which arrives at database or other data management system device. The analytics engine 420 which is responsible for analyzing and processing the data and a blockchain 430 which stores the transactions related to the data. In operation, data is received and stored 412, data transformations 414 may be performed by the analytics engine 420 to create realizable data based on the original data received. The transformed data is also stored in the blockchain 416. Chaincode is created 418 to reflect the modifications, protocols and other processing operations performed to the data. The chaincode and related metadata 422 are both stored in the blockchain 430 as well. A request for audit of the stored data may be performed 424 and the transformed data may be retrieved with the chaincode 426 in an effort to recreate the original data. The data is then re-processed 428 and a confirmation or rejection is identified based on the results of the re-processing 432.

A provenance graph may be generated that illustrates the different transformations a set of data underwent in-route (i.e., data path) to the generation of an analytics report. In this example, the metadata in the blockchain demonstrates that this is the first step in the data path (data ingestion), which is generated by a sensor installed in a remote datacenter. The metadata may include a transaction ID, a transaction type, a timestamp, an ingestion timestamp, a comment, an uploader email, a filename, an upload ID, a blue ID, a datahash, a document hash and a signature. The chaincode executes transformations. The analytics code is implemented as a chaincode/smart contract. When a chaincode is deployed, a smart contract is also deployed with some functionality. A chaincode library, for example, may be deployed and all subsequent chaincode can invoke this library to perform an operation. For example, a library having a function compute_tier(volume) is created and the library is deployed as chaincode, another library having another function called compare_tiers(volume, volume) is then deployed. I can then write another chaincode that sorts volumes based on tier levels, such as sort_volumes(volume_list). This function may compute the tier for each volume, then compare the volume tier. Instead of including that in the chaincode, the previous two chaincodes may be linked. In another example, the original data and the original metadata would ultimately be compared to resultant metadata from the re-processing and reconstruction effort, then if they are the same, then the analytical data is deemed valid. Data verification helps verify if re-running the workload yields the same result. Keeping provenance data guarantees that results can be reproduced from any previous run. A new job request is essentially a request to do analytics on a new set of data.

According to another example, the engine operations by logging in the blockchain all analytics/transformations applied to a portion of data. The provenance/auditing component will re-run everything as it happened, or as it is recorded in the blockchain. For instance, to validate that the correct volume tiers were received, the auditing service will replay all analytic steps beginning from the very first data ingestion entry and moving on to all data processes. In a provenance graph each entry has metadata that identifies which data was manipulated (input), which data was generated (output), and which analytic chaincode was executed. The auditing service will then start from the top-most node in the graph and execute chaincode with the right data sets in order to reproduce the result. At any given time, if the results do not match, then it can be detected either that there was a failure in the execution or someone tampered with the data, and that event can be pinpointed in the data path.

Figure 5A:
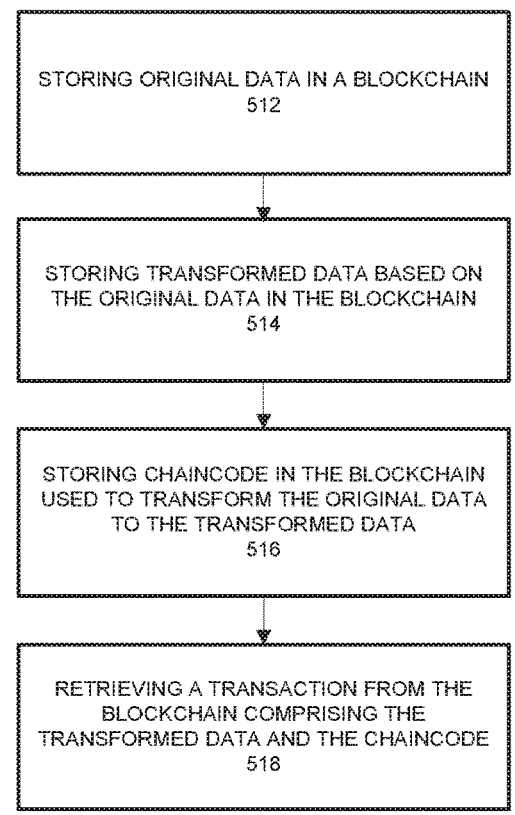
FIG. 5A illustrates a flow diagram of an example method of creating data provenance and audit information in the blockchain according to example embodiments.

FIG. 5A illustrates a flow diagram of an example method of creating data provenance and audit information in the blockchain according to example embodiments. Referring to FIG. 5A, the method 500 may include storing original data in a blockchain 512, storing transformed data based on the original data in the blockchain 514, storing chaincode on the blockchain used to transform the original data to the transformed data 516, and retrieving a transaction from the blockchain comprising the transformed data and the chaincode 518. The retrieval may be performed to audit the data for validity. The method may also include processing the original data and the chaincode to verify the transformed data, and storing results of the processed original data and the chaincode used to verify the transformed data in new a transaction. The method may also include storing metadata in the blockchain, and the metadata includes one or more of time stamps, address information and transformation types used to transform the data. The method may further provide processing the original data and the chaincode to verify the transformed data by processing the chaincode with the metadata to produce a verification data and comparing the verification data to the transformed data. Also, if the verification data matches the transformed data, then the transformed data is deemed valid otherwise it may be deemed invalid or tampered data. The method may also include receiving a request to verify the transformed data and retrieving the transaction from the blockchain including the transformed data and the chaincode, and responsive to receiving the request, determining a hash of the transformed data, and storing the hash of the transformed data in the blockchain.

Figure 5B:
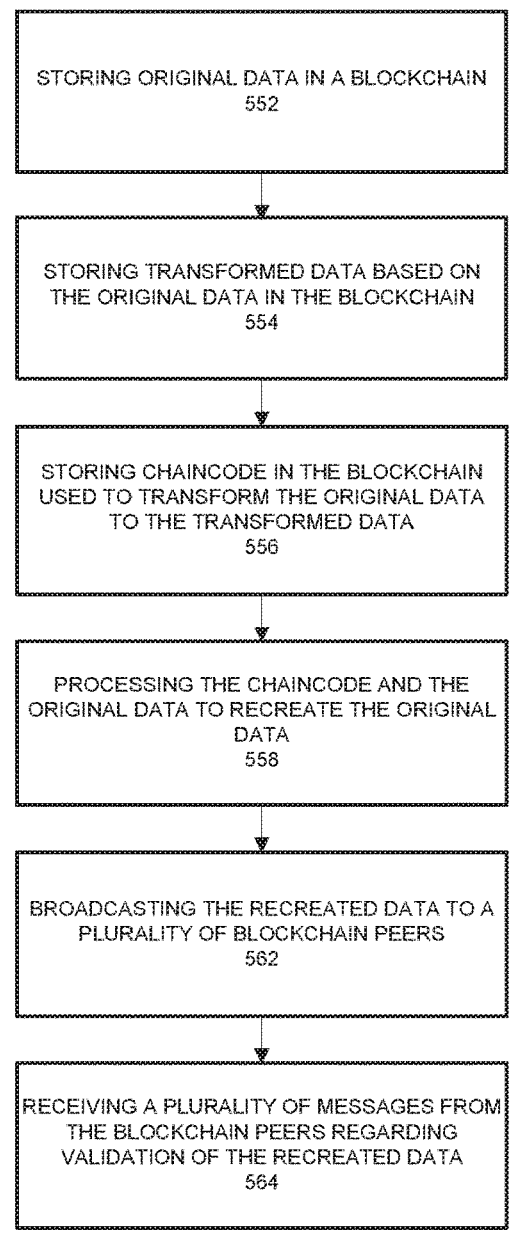
FIG. 5B illustrates another flow diagram of another example method of creating data provenance and audit information in the blockchain according to example embodiments.

FIG. 5B illustrates another flow diagram of another example method of creating data provenance and audit information in the blockchain according to example embodiments. Referring to FIG. 5B, the method 550 may include storing original data in a blockchain 552, storing transformed data based on the original data in the blockchain 554, storing chaincode on the blockchain used to transform the original data to the transformed data 556, processing the chaincode and the original data to recreate the original data 558, broadcasting the recreated data to a plurality of blockchain peers 562, and receiving a plurality of message from the blockchain peers regarding validation of the recreated data 564. In this example, the blockchain peers can receive the recreated data and provide feedback regarding whether the recreated data is in fact comparable or the same as the original data. The voting may be from various peers and the result may require a threshold vote figure, such as, for example, 80 percent or more of the peers agreeing that the recreated data is valid and is comparable to the original data. This ensures the recreation process is valid and does not include tampered data or is not erroneous. The recreated data may also be related to a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 6:
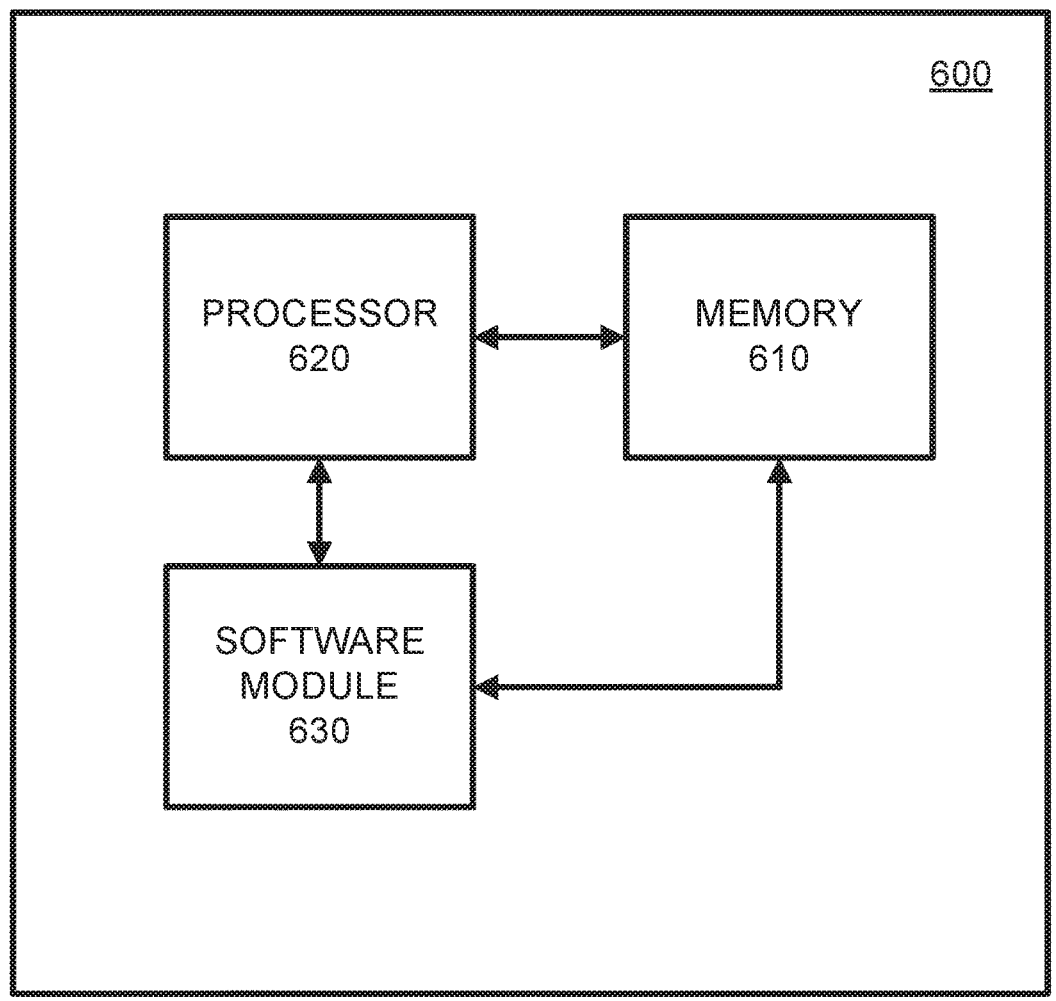
FIG. 6 illustrates an example network entity configured to support one or more of the example embodiments.

As illustrated in FIG. 6, a memory 610 and a processor 620 may be discrete components of a network entity 600 that are used to execute an application or set of operations as described herein. The application may be coded in software in a computer language understood by the processor 620, and stored in a computer readable medium, such as, a memory 610. The computer readable medium may be a non-transitory computer readable medium that includes tangible hardware components, such as memory, that can store software. Furthermore, a software module 630 may be another discrete entity that is part of the network entity 600, and which contains software instructions that may be executed by the processor 620 to effectuate one or more of the functions described herein. In addition to the above noted components of the network entity 600, the network entity 600 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
storing original data in a blockchain;
storing transformed data based on the original data in the blockchain;
storing chaincode on the blockchain used to transform the original data to the transformed data,
wherein the chaincode comprises a software stack to be audited that executed at a particular point in time;
receiving a request to verify the transformed data;
retrieving a transaction from the blockchain to get the transformed data and the chaincode, responsive to receiving the request;
processing the original data and the chaincode with a metadata to produce a verification data; and
comparing the verification data to the transformed data.

2. The method of claim 1, further comprising:
processing the original data and the chaincode to verify the transformed data; and
storing results of the processed original data and the chaincode used to verify the transformed data in a new transaction.

3. The method of claim 2, further comprising:
storing metadata in the blockchain, wherein
the metadata comprises one or more of time stamps, address information, and transformation types used to transform the data.

4. The method of claim 3, wherein the processing the original data and the chaincode to verify the transformed data comprises processing the chaincode with the metadata to produce a verification data and comparing the verification data to the transformed data.

5. The method of claim 4, wherein when the verification data matches the transformed data, then the transformed data is valid.

6. The method of claim 1, further comprising:
determining a hash of the transformed data; and
storing the hash of the transformed data in the blockchain.

7. An apparatus, comprising:
a processor configured to:
store original data in a blockchain;
store transformed data based on the original data in the blockchain;
store chaincode on the blockchain used to transform the original data to the transformed data,
wherein the chaincode comprises a software stack to be audited that executed at a particular point in time;
receive a request to verify the transformed data;
retrieve a transaction from the blockchain to get the transformed data and the chaincode, responsive to receiving the request;
process the original data and the chaincode with the metadata to produce a verification data; and
compare the verification data to the transformed data.

8. The apparatus of claim 7, wherein the processor is further configured to:
process the original data and the chaincode to verify the transformed data; and
store results of the processed original data and the chaincode used to verify the transformed data in a new transaction.

9. The apparatus of claim 8, wherein the processor is further configured to:
store metadata in the blockchain, wherein
the metadata comprises one or more of time stamps, address information, and transformation types used to transform the data.

10. The apparatus of claim 9, wherein to process the original data and the chaincode to verify the transformed data, the processor is further configured to:
process the chaincode with the metadata to produce a verification data; and
compare the verification data to the transformed data.

11. The apparatus of claim 10, wherein when the verification data matches the transformed data, then the processor is configured to determine that the transformed data is valid.

12. The apparatus of claim 7, wherein the processor is further configured to:
determine a hash of the transformed data; and
store the hash of the transformed data in the blockchain.

13. A non-transitory computer readable storage medium storing instructions that, when executed, are configured to cause a processor to perform:
storing original data in a blockchain;
storing transformed data based on the original data in the blockchain;
storing chaincode on the blockchain used to transform the original data to the transformed data,
wherein the chaincode comprises a software stack to be audited that executed at a particular point in time;
receiving a request to verify the transformed data;
retrieving a transaction from the blockchain to get the transformed data and the chaincode, responsive to receiving the request;
processing the original data and the chaincode with the metadata to produce a verification data; and
comparing the verification data to the transformed data.

14. The non-transitory computer readable storage medium of claim 13, wherein the instructions are further configured to cause the processor to perform:
processing the original data and the chaincode to verify the transformed data; and
storing results of the processed original data and the chaincode used to verify the transformed data in a new transaction.

15. The non-transitory computer readable storage medium of claim 14, wherein the instructions are further configured to cause the processor to perform:
storing metadata in the blockchain, wherein
the metadata comprises one or more of time stamps, address information, and transformation types used to transform the data.

16. The non-transitory computer readable storage medium of claim 15, wherein the processing the original data and the chaincode to verify the transformed data comprises processing the chaincode with the metadata to produce a verification data and comparing the verification data to the transformed data.

17. The non-transitory computer readable storage medium of claim 16, wherein when the verification data matches the transformed data, then the transformed data is valid.

18. The non-transitory computer readable storage medium of claim 13, wherein the instructions are further configured to cause the processor to perform:
   determining a hash of the transformed data; and
   storing the hash of the transformed data in the blockchain.

* * * * *